United States Patent [19]
Cruson

[11] Patent Number: 5,542,883
[45] Date of Patent: Aug. 6, 1996

[54] STRAW SPREADING SYSTEM

[75] Inventor: Izaak P. J. Cruson, Regina, Canada

[73] Assignee: Dutch Industries Ltd., Regina, Canada

[21] Appl. No.: 458,248

[22] Filed: Jun. 2, 1995

[51] Int. Cl.$^6$ ..................................... A01F 29/02
[52] U.S. Cl. ........................................... 460/112; 460/901
[58] Field of Search .................................. 460/112, 111, 460/113, 119, 901, 21; 56/16.6

[56] References Cited

U.S. PATENT DOCUMENTS

| 4,617,942 | 10/1986 | Garner | 460/112 |
| 4,892,504 | 1/1990 | Scott et al. | 460/112 |

FOREIGN PATENT DOCUMENTS

| 2066860 | 10/1993 | Canada . | |
| 0357090 | 3/1990 | European Pat. Off. | 460/112 |

Primary Examiner—Terry Lee Melius
Attorney, Agent, or Firm—Adrian D. Battison; Murray E. Thrift

[57] ABSTRACT

The present invention provides an improved chopper for use with a harvester-thresher having a straw and chaff spreader for delivering a portion of the chopped straw rearwards to the ground and for delivering a portion of the chopped straw to a Kirby type or similar straw and chaff spreader. The chopper comprises a chopper housing, a knife bar, a flail, a drive means, a plurality of first outlets arranged in the bottom wall of the chopper for communication of a first portion of the chopped waste material to the spreader, and a second outlet arranged rearward of the plurality of first outlets for the communication of a second portion of the chopped waste material to the ground, said second outlet having straw deflectors on a rear deck for direction of said material.

22 Claims, 4 Drawing Sheets

STRAW SPREADING SYSTEM

FIELD OF THE INVENTION

The present invention provides an improved chopper for use with a harvester-thresher and a Kirby type or similar straw and chaff spreader for delivering a portion of the chopped straw rearwards to the ground and for delivering a portion of the chopped straw to the straw and chaff spreader.

BACKGROUND

When harvesting agricultural crops using a combined harvester-thresher by-products are produced. The by-products are typically straw and chaff however other by-products can also be produced when harvesting various crop types. Unless these by-products are collected and bailed it is important to good farming practice to spread the by-products back over the area they originally occupied before harvesting.

This is particularly the case when employing zero-tillage farming techniques. Furthermore, when employing zero-tillage it is important that the straw component of the by-products be chopped as finely as possible, and for all the by-product to be distributed as evenly as possible.

A number of spreaders for use with harvester-threshers are known. One such is the Kirby spreader as taught in Canadian Patent 2,066,860, issued Nov. 23, 1993, which comprises a plurality of rotating flails arranged above a plurality of spreader fins rotating in an enclosure having an open top to receive straw and chaff therethrough and having an outlet arranged on each side of the enclosure.

The Kirby spreader is designed to be used with harvester-threshers that do not employ a straw choppers. The spreader is operated by placing the spreader directly beneath the straw and chaff outlets of a harvester-thresher. The straw and chaff and other by-products exit the outlets and pass through the rotating flails of the spreader. Large pieces of unchopped straw and some of the other by-products are spread by the flails while the remaining smaller material falls to the spreader fins and are spread thereby. The material spread by the spreader fins exits through the outlets in the enclosure distributing the material a distance laterally outwards from the harvester-thresher forming two spaced apart rows with the large straw pieces spread by the flails lying therebetween.

This process does not work well with a harvester-thresher employing a straw chopper for chopping the straw into the small pieces required for zero-tillage farming. Current choppers chop the straw into small pieces and then deliver all the straw to the ground or to a spreader lying below the chopper. When used with a Kirby or like spreader most of the straw will fall though the flails to the rotating spreader fins. This leads to uneven distribution of the by-products since most of the material ends up in the two spaced apart rows with very little material lying therebetween.

An improved chopper is needed for use with a harvester-thresher and a Kirby type or similar straw and chaff spreader which delivers a portion of the chopped straw rearwards to the ground behind the harvester-thresher and a portion of the chopped straw to the straw and chaff spreader thereby permitting even distribution of the straw and other harvest by-products.

SUMMARY

According to the present invention there is provided a harvester-thresher for moving over the ground and harvesting agricultural crops comprising: threshing means for separating straw and chaff from said crops; outlet means for the straw and chaff arranged at a rearward end of the harvester-thresher; a straw and chaff spreader arranged beneath said straw and chaff outlet means; and a chopper having chopping means for receiving straw from the outlet means for chopping the straw into smaller pieces, a chopper housing fixed to the harvester-thresher adjacent the outlet means for directing the straw material to the chopping means, a least one first outlet for communication of a first portion of the chopped straw to the spreader, a second outlet arranged for the communication of a second portion of the chopped straw beyond the spreader to the ground.

Preferably the chopping means comprise a plurality of spaced apart knife blades arranged in a row. The knife blades are fixed to the chopper housing. The chopping means includes a flail which has a rotatable elongate member and a plurality of spaced apart flails arranged in a row on the elongate member for rotation therewith such that the flails cooperate with the knife blades by passing between the knife blades as the elongate member rotates. A drive means is connected to the flail for rotation of the elongate member.

The chopper includes optional flow restriction means for varying the first portion of chopped straw passing through the at least one first outlet. The flow restriction means comprise at least one baffle which is removably and reengageably fixed to the chopper housing such that the at least one baffle spans the at least one first outlet thereby reducing the chopped straw passing through the at least one first outlet.

Preferably the at least one first outlet comprises two spaced apart openings. Each opening is spaced inwards from a respective side of the chopper housing. The openings are arranged in a row aligned with the rotatable elongate member, and are spaced such that the second portion of chopped straw can pass to the sides of and between the openings to the second outlet. The openings are substantially rectangular in shape.

Preferably the chopper housing includes a substantially vertical portion arranged adjacent the outlet means and a substantially horizontal portion extending from an end lying adjacent a bottom end of the substantially vertical portion to an end remote from the substantially vertical portion. The chopper housing includes a curved portion extending from the bottom end of the substantially vertical portion to the end of the substantially horizontal portion lying adjacent the bottom end of the substantially vertical portion to the end of the substantially horizontal portion lying adjacent the bottom end.

The knife blades are arranged on the substantially vertical portion of the chopper housing, and the at least one first outlet is arranged to extend from a point below and adjacent the blades into the substantially horizontal portion of the chopper housing.

Preferably the second outlet includes a deck arranged to direct straw outwards beyond the extent of the straw and chaff spreader. The second outlet includes straw deflectors for directing of the second portion of the chopped straw outwards and laterally away from the second outlet such that the chopped straw is distributed substantially evenly over the ground.

According to a second aspect of the present invention there is provided a kit of parts for modifying a straw chopper used on a harvester-thresher, the harvester-thresher being of the type for moving over the ground and harvesting agricultural crops thereon, said harvester-thresher comprising threshing means for separating straw and chaff from said crops, outlet means for the straw and chaff arranged at a rearward end of the harvester-thresher, a straw and chaff spreader arranged beneath said straw and chaff outlet means, the kit of parts comprising a chopper housing for fixing to a harvester-thresher adjacent the straw and chaff outlet means, said chopper housing having a least one first outlet for communication of a first portion of the chopped straw to the spreader, a second outlet arranged for the communication of a second portion of the chopped straw beyond the spreader to the ground, and knife blade mounting means for fixing a plurality of spaced apart knife blades arranged in a row on the chopper housing.

Although the above refers to crops having straw and chaff as well as other byproducts it is intended that it be understood that this invention may be used with any combined harvester-thresher and like machine when harvesting any crop which can be harvested thereby. The terms straw and chaff are meant to mean the stems, leaves and material surrounding the seeds which are usually unused by-products of the harvesting process.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
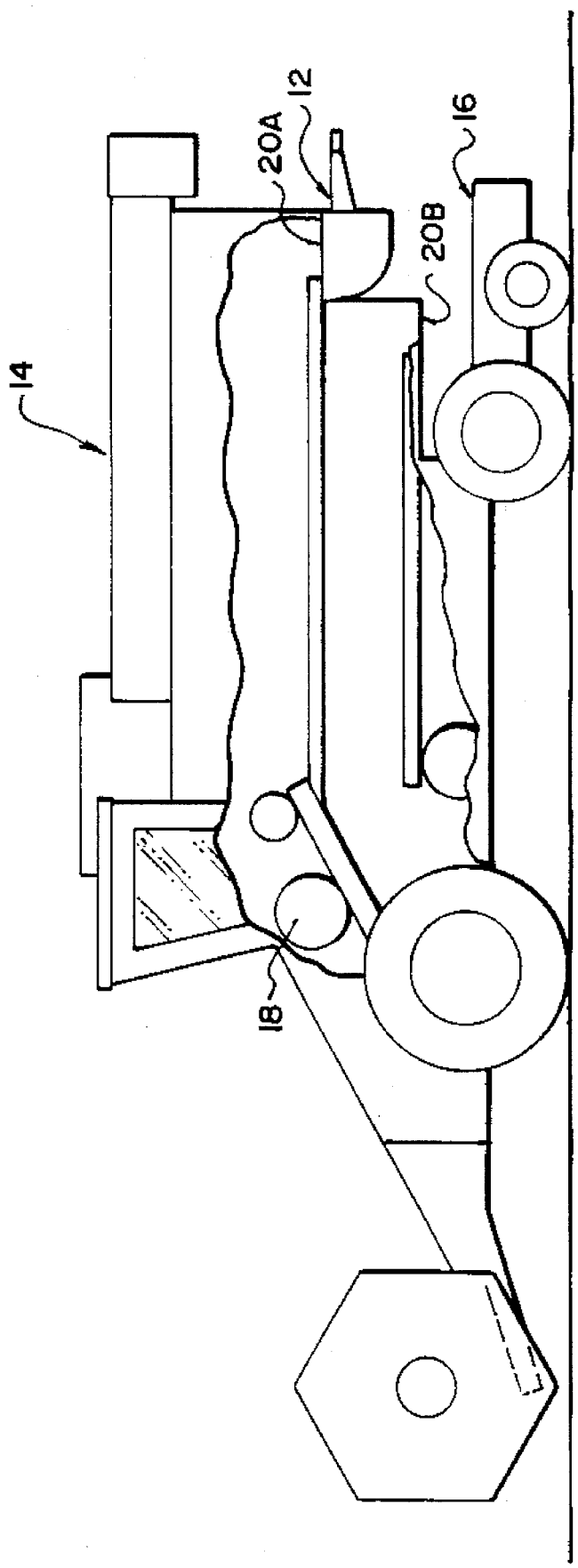
FIG. 1 is a cut away view of the harvester-thresher.
Figure 2:
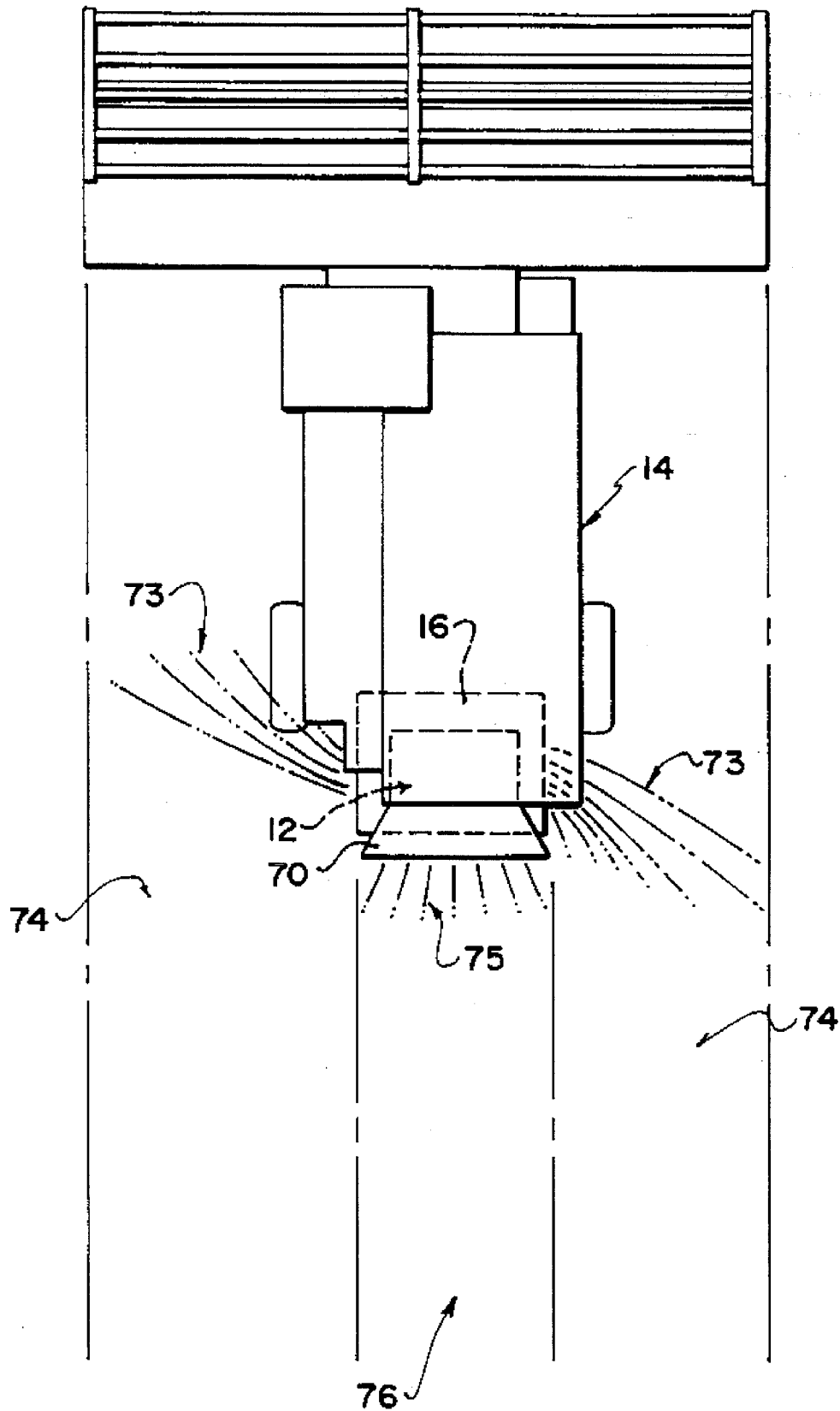
FIG. 2 is a top view of the harvester-thresher showing the pattern of chaff and straw distributed by the chopper and spreader.

Referring to FIGS. 1 and 2 a preferred embodiment of the improved chopper for use on a harvester-thresher 14 is shown generally at 12. The chopper 12 is for use with a harvester-thresher 14 of the type used to harvest agricultural crops and which can be employed with a straw and chaff spreader 16. The straw and chaff spreader 16 distributes the straw and chaff back over a large area. Harvester-threshers 14 of this type typically include threshing means 18 for separating straw and chaff from the crops, and outlet means 20 for the straw and chaff arranged at a rearward end of the harvester-thresher 14. Usually the outlet means provide separate outlets 20a and 20b for the straw and chaff respectively, which are arranged one above the other, and are off-set from one another in a horizontal plane. The straw and chaff spreader 16 is arranged beneath the straw and chaff outlet means 20 to collect and spread the straw and chaff.

Figure 3:
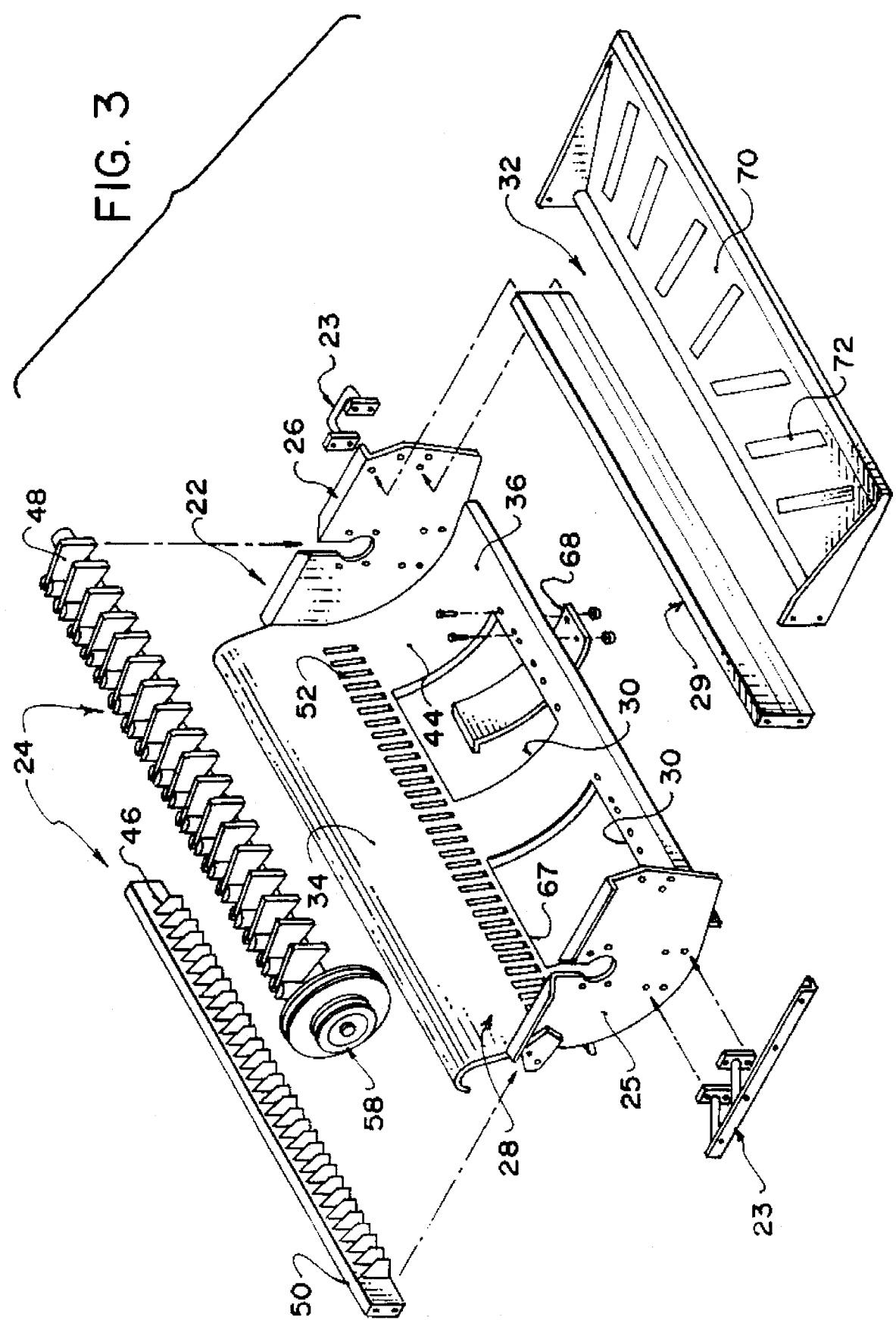
FIG. 3 is and exploded isometric view of the chopper.
Figure 5:
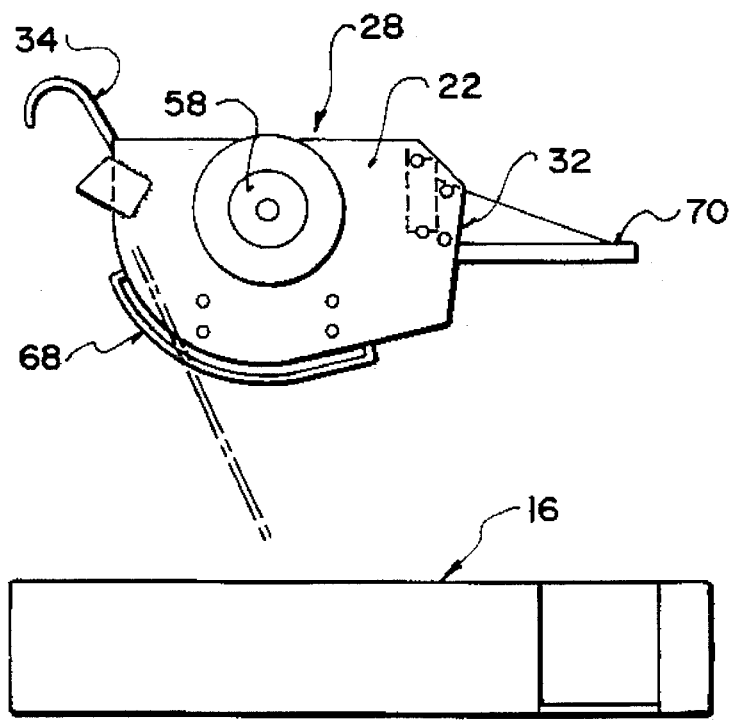
FIG. 5 is a side view of the chopper.

Referring to FIG. 3 and 5 the chopper 12 comprises a chopper housing 22, chopping means 24, at least one first outlet 30 arranged in the chopper housing 22, and a second outlet 32 arranged in the chopper housing 22 rearward of the plurality of first outlets 30.

The chopper 12 has an improved chopper housing 22 designed to replace the chopper housings on currently available choppers. The chopper housing 22 is fixed to the harvester-thresher 14 adjacent the outlet means 20 to receive straw from the outlet means 20 and to direct the straw to the chopping means 24 for chopping the straw into smaller pieces. The chopper housing 22 is fixed to the harvester-thresher 14 by mounting brackets and bolts 23. The improved chopper housing 22 is designed to use the same mounting brackets and bolts 23 as the currently available chopper housing which it is designed to replace. The chopper housing extends from a closed front downwards to a bottom, has removable side panels 25 and 26, an open top 28, and a rear plate 29 closing a portion of the rear of the housing. The front chopper housing 22 is a substantially vertical portion 34 arranged adjacent the outlet means 20a and the bottom is a substantially horizontal portion 36. A curved portion 44 extends from the bottom of the substantially vertical portion 34 to the substantially horizontal portion 36.

The chopping means 24 are of the type having a plurality of spaced apart knife blades 46 and a plurality of rotating flails 48. The plurality of spaced apart knife blades 46 are arranged in a row and have mounting means for fixing the knife blades 46 to the chopper housing 22. The mounting means comprise an elongate member 50 to which the knife blades 46 are fixed, a plurality of openings 52 in the chopper housing 22 through which the knifes project, and fixing means for fixing the elongate member in place on the exterior of the housing. Alternatively the knife blades may be fixed directly to an interior surface of the chopper housing 22.

The plurality of rotating flails 48 having a rotatable elongate member 58 are arranged in a row on the elongate member 58 for rotation therewith. The flails 48 are arranged to cooperate with the knife blades 46 passing between the knife blades 46 as the elongate member 58 rotates. A drive means is connected to the plurality of rotating flails 48 for rotation of the elongate member 58.

In a conventional chopper the knife blades are located on a bottom portion of the chopper housing, which in the chopper being described would be on the substantially horizontal portion 36 of the chopper housing 22. In the improved chopper the knife blades 46 have been moved from the usual position to a position arranged on the substantially vertical portion 34 of the chopper housing 22. This allows for outlet means to be positioned in a bottom portion of the chopper housing 22.

The chopper 12 includes at least one first outlet 30 for communication of a first portion of the chopped straw to the straw and chaff spreader 16. In the present chopper 12 the at least one first outlet 30 comprises two spaced apart openings 30 each being spaced inwards from a respective side 68 and 70 of the chopper housing 22. The openings 30 are arranged in a row aligned with the rotatable elongate member 58, and are spaced such that the second portion of chopped straw can pass to the sides of and between the openings 30 to the second outlet 32. The openings 30 are substantially rectangular in shape and are located in a bottom portion of the chopper housing 22 from at position extending from a point 67 below and adjacent the knife blades 46 downwards and rearwards into the substantially horizontal portion 36 of the chopper housing 22.

To vary the first portion of chopped straw which passes through the first outlets an optional flow restriction means may be included. The flow restriction means comprise at least one baffle 68. The at least one baffle 68 is removably and reengageably fixed to the chopper housing 22 such that the at least one baffle 68 spans each of the openings 30 thereby reducing the chopped straw passing therethrough.

Figure 4:
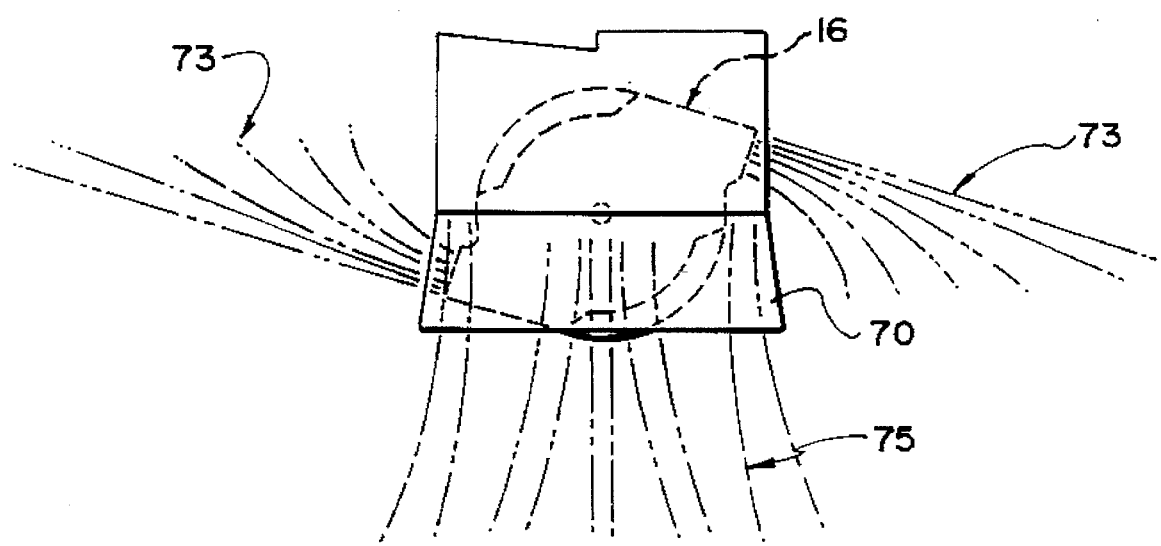
FIG. 4 is an enlarged top view of the spreader and chopper deck.

Referring to FIGS. 2, 3, and 4 the chopper 12 also includes a second outlet 32. The second outlet 32 communicates of a second portion of the chopped straw from the chopper 12 beyond the spreader 16 rearwards and onto the ground behind the harvester-thresher. The second outlet 32 includes a deck 70 arranged to direct straw outwards beyond the extent of the straw and chaff spreader 16 and straw deflectors 72 for direction of the second portion of the chopped straw laterally outwards from the second outlet 32 such that the chopped straw is distributed substantially evenly over the ground.

In use straw from the threshing process exits from the rear of the harvester-thresher via the outlet means 20a and enters the chopper 12. The straw is chopped into smaller pieces in the chopper 12 by the knife blades 46 and the rotating flail members 48.

Referring to FIGS. 2 and 4 a first portion 73 of the chopped straw exits through the openings 30 in the bottom portion of the chopper housing 22 and enters the straw and chaff spreader 16 along with any chaff and other byproducts of threshing exiting the outlet means 20b. This material 73 is spread laterally a distance outwards from the harvester-thresher 14 and falls to the ground substantially forming two spaced apart rows 74 one on either side of the harvester-thresher 14. A second portion 75 of chopped straw passes between and to the side of the openings 30 to the second outlet 32. The chopped straw passes through the opening in the back of the chopper housing outwards onto the deck 70 where it is directed by deflectors 72 outwards and laterally away form the harvester-thresher 14 beyond the spreader 16 to fall upon the ground behind the harvester-thresher 14. The second portion of chopped straw is directed by the deflectors 72 such that it falls substantially evenly into the area 76 lying between the two spaced apart rows 74 formed by the spreader. This arrangement thereby provides for finely chopping and evenly spreading over a wide area the by-products of harvesting and threshing the crops.

Although the above description has been primarily concerned with crops such as grain having straw and chaff as well as other byproducts it is intended that it be understood that this invention may be used with any combined harvester-thresher and like machine when harvesting any crop which can be harvested thereby. The terms straw and chaff are meant to mean the stems, leaves and material surrounding the seeds which are usually unused by-products of the harvesting process.

While one embodiment of the present invention has been described in the foregoing, it is to be understood that other embodiments are possible within the scope of the invention. The invention is to be considered limited solely by the scope of the appended claims.

I claim:

1. A harvester-thresher for moving over the ground and harvesting agricultural crops comprising:

threshing means for separating straw and chaff from said crops;

outlet means for the straw and chaff arranged at a rearward end of the harvester-thresher;

a straw and chaff spreader arranged beneath said straw and chaff outlet means;

and a chopper having chopping means for receiving straw from the outlet means for chopping the straw into smaller pieces;

a chopper housing fixed to the harvester-thresher adjacent the outlet means for directing the straw material to the chopping means, the chopper housing being located between the outlet means and the straw and chaff spreader;

a least one first outlet in the chopper housing for communication of a first portion of the chopped straw to the spreader;

and a second outlet in the chopper housing arranged for the communication of a second portion of the chopped straw beyond the spreader to the ground.

2. A harvester-thresher in accordance with claim 1 wherein the chopping means comprise:

a plurality of spaced apart knife blades arranged in a row, said knife blades being fixed to the chopper housing;

a flail assembly having a rotatable elongate member and a plurality of spaced apart flails arranged in a row on the elongate member for rotation therewith such that the flails cooperate with the knife blades passing between said knife blades as the elongate member rotates;

a drive means connected to the flail assembly for rotation of the elongate member.

3. A harvester-thresher in accordance with claim 1 wherein the at least one first outlet includes flow restriction means for varying a volume of the first portion of chopped straw passing therethrough.

4. A harvester-thresher in accordance with claim 3 wherein the flow restriction means comprise at least one baffle which is removably and reengageably fixed to the chopper housing and arranged such that the at least one baffle spans the at least one first outlet thereby reducing the volume of the chopped straw passing through the at least one first outlet.

5. A harvester-thresher in accordance with claim 1 wherein the at least one first outlet comprises two spaced apart openings each being spaced inwards from a respective side of the chopper housing such that the second portion of chopped straw can pass to the sides of and between the openings to the second outlet.

6. A harvester-thresher in accordance with claim 5 wherein the openings are substantially rectangular in shape.

7. A harvester-thresher in accordance with claim 1 wherein the chopper housing includes a substantially vertical portion arranged adjacent the outlet means and a substantially horizontal portion extending from a forward end lying adjacent a bottom end of the substantially vertical portion to a rearward end remote from the substantially vertical portion.

8. A harvester-thresher in accordance with claim 7 wherein the chopper housing includes a curved portion extending from the bottom end of the substantially vertical portion to the forward end of the substantially horizontal portion.

9. A harvester-thresher in accordance with claim 2 wherein the chopper housing includes a substantially vertical portion arranged adjacent the outlet means and a substantially horizontal portion extending from a forward end lying adjacent a bottom end of the substantially vertical portion to a rearward end remote from the substantially vertical portion, and wherein the chopper housing includes a curved portion extending from the bottom end of the substantially vertical portion to the forward end of the substantially horizontal portion.

10. A harvester-thresher in accordance with claim 9 wherein the knife blades are arranged on the substantially vertical portion of the chopper housing and the at least one first outlet is arranged to extend from a point below and adjacent the blades into the substantially horizontal portion of the chopper housing.

11. A harvester-thresher in accordance with claim 1 wherein the chopper housing includes a guide deck arranged adjacent the second outlet to direct the second portion of the chopped straw outwards beyond the extent of the straw and chaff spreader.

12. A harvester-thresher in accordance with claim 11 wherein the guide deck includes straw deflectors for direction of the second portion of the chopped straw outwards and laterally away from the second outlet such that the second portion of the chopped straw is distributed substantially evenly over the ground.

13. A kit of parts for modifying a straw chopper used on a harvester-thresher, the harvester-thresher being arranged for moving over the ground and harvesting agricultural crops thereon, said harvester-thresher comprising threshing means for separating straw and chaff from said crops, outlet means for the straw and chaff arranged at a rearward end of the harvester-thresher, a straw chopper for receiving and chopping straw from the outlet means and a straw and chaff spreader arranged beneath said outlet means to receive straw and chaff therefrom, the kit of parts comprising:

a chopper housing for fixing to a harvester-thresher adjacent the outlet means for receiving straw therefrom, the chopper housing including means for cooperating with the straw chopper for chopping the straw, said chopper housing having a least one first outlet for communication of a first portion of the chopped straw to the spreader, and a second outlet arranged for the communication of a second portion of the chopped straw beyond the spreader to the ground.

14. A kit of parts in accordance with claim 13 wherein the at least one first outlet includes flow restriction means for varying a volume of the first portion of chopped straw passing therethrough.

15. A kit of parts in accordance with claim 14 wherein the flow restriction means comprise at least one baffle which is removably and reengageably fixed to the chopper housing and arranged such that the at least one baffle spans the at least one first outlet thereby reducing the volume of the chopped straw passing through the at least one first outlet.

16. A kit of parts in accordance with claim 13 wherein the at least one first outlet comprises two spaced apart openings each being spaced inwards from a respective side of the chopper housing such that the second portion of chopped straw can pass to the sides of and between the openings to the second outlet.

17. A kit of parts in accordance with claim 16 wherein the openings are substantially rectangular in shape.

18. A kit of parts in accordance with claim 13 wherein the chopper housing includes a substantially vertical portion arranged adjacent the outlet means and a substantially horizontal portion extending from a forward end lying adjacent a bottom end of the substantially vertical portion to a rearward end remote from the substantially vertical portion.

19. A kit of parts in accordance with claim 18 wherein the chopper housing includes a curved portion extending from the bottom end of the substantially vertical portion to the forward end of the substantially horizontal portion.

20. A kit of parts in accordance with claim 19 wherein means for cooperating with the straw chopper for chopping the straw comprises a plurality of spaced apart knife blades arranged in a row on the chopper housing and wherein the knife blades are arranged on the substantially vertical portion of the chopper housing and the at least one first outlet is arranged to extend from a point below and adjacent the knife blades into the substantially horizontal portion of the chopper housing.

21. A kit of parts in accordance with claim 13 wherein the chopper housing includes a guide deck arranged to direct the second portion of the chopped straw outwards beyond the extent of the straw and chaff spreader.

22. A kit of parts in accordance with claim 21 wherein the guide deck includes straw deflectors for direction of the second portion of the chopped straw outwards and laterally away from the second outlet such that the second portion of the chopped straw is distributed substantially evenly over the ground.

* * * * *